UNITED STATES PATENT OFFICE.

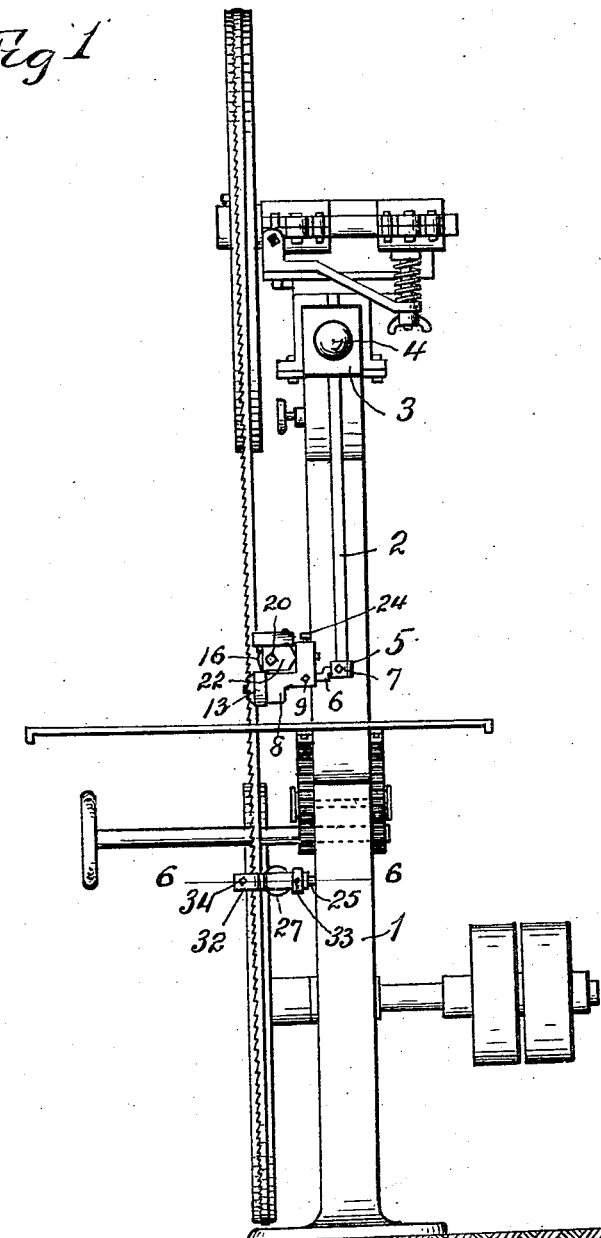

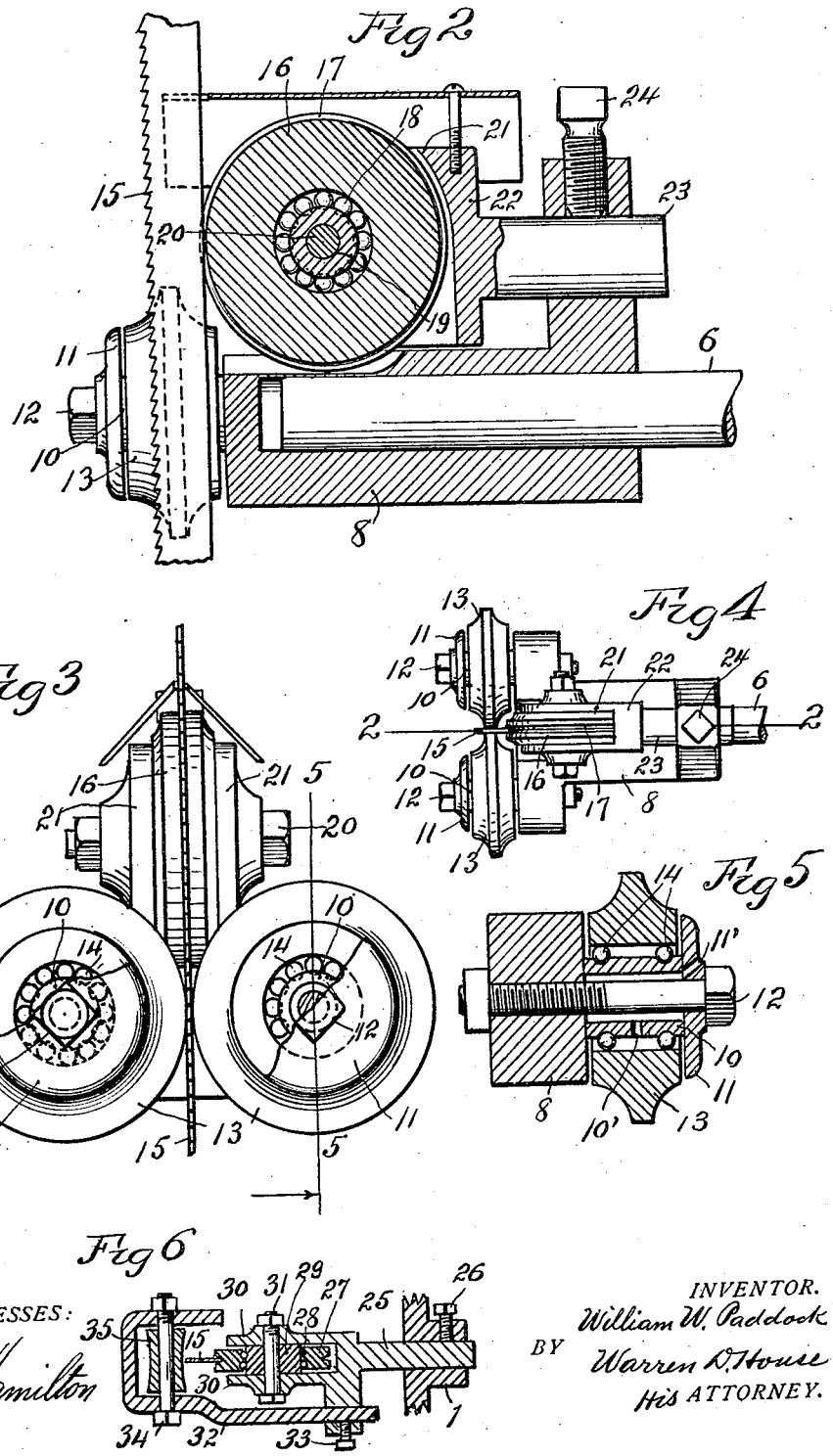

WILLIAM W. PADDOCK, OF KANSAS CITY, KANSAS.

BAND-SAW GUIDE.

1,415,386.  Specification of Letters Patent.  Patented May 9, 1922.

Application filed January 12, 1920. Serial No. 350,722.

*To all whom it may concern:*

Be it known that I, WILLIAM W. PADDOCK, a citizen of the United States, residing at Kansas City, in the county of Wyandotte and State of Kansas, have invented a certain new and useful Improvement in Band-Saw Guides, of which the following is a specification.

My invention relates to improvements in band saw guides.

One of the objects of my invention is to provide novel means for limiting the forward movement of a band saw.

A further object of my invention is to provide novel means for guiding the rear edge of a band saw and the sides thereof.

The novel features of my invention further reside in simplicity of construction, durability, cheapness of construction, efficiency of operation, and ready adaptation of the invention to band saws now in use.

The novel features of my invention are hereinafter fully described and claimed.

In the accompanying drawings which illustrate the preferred embodiment of my invention, Fig. 1 is a side elevation of my improvement shown applied to a band saw machine.

Fig. 2 is an enlarged vertical sectional view on the line 2—2 of Fig. 4.

Fig. 3 is an enlarged front elevation, partly broken away, of the two side guide rollers and parts associated therewith.

Fig. 4 is a top view of what is shown in Fig. 3.

Fig. 5 is a vertical sectional view on the line 5—5 of Fig. 3.

Fig. 6 is a horizontal sectional view, enlarged, on the line 6—6 of Fig. 1.

Similar reference characters designate similar parts in the different views.

1 designates the frame of an ordinary band saw machine. Vertically adjustable on the frame 1 is a vertical bar 2, which passes through the arm 3 of the machine, to which arm the bar is secured by a set screw 4. A block 5 is carried on the lower end of the bar 2 and has forwardly and rearwardly adjustable in it a horizontal bar 6, which is held in position by a set screw 7 in the block 5.

A support comprising a block 8 is slidable on the bar 6 to which it may be secured by a set screw 9, Fig. 1.

Two sleeves 10 have their rear ends bearing against the support 8 to which they are clamped by two plates 11 through which extend respectively two bolts 12 mounted in the support 8 and extending respectively through the sleeves 10. The holes in the sleeves are larger than the diameters of the bolts, so that the sleeves may be adjusted laterally toward and from each other. Each sleeve 10 has a lateral oil hole 10'.

Mounted on the sleeves 10 respectively are two rollers 13. Balls 14 are interposed between the rollers 13 and the sleeves 10, the latter being provided each with two peripheral grooves in which balls 14 are located.

The rollers 13 are adapted to engage opposite sides respectively of the band saw 15, for laterally guiding the saw. Each plate 11 has an oil hole 11'.

A roller 16 having a peripheral groove 17, preferably of V shape, is mounted on balls 18 which run on the periphery of a horizontal transverse sleeve 19, which in turn is mounted on a bolt 20, which extends through two forwardly extending arms 21 of a block 22, having a cylindrical rear extension 23, which is forwardly and rearwardly adjustable in a hole provided in the block 8. A set screw 24 in the block 8 is adapted to engage and hold the extension 23.

The rear edge of the band saw 15 is mounted in and adapted to run in the V-shaped groove of the roller 16. The V-shape of the groove adapts the roller to saws of different thicknesses without permitting lateral play to the rear edge of the saw.

By adjusting the sleeves 10 the rollers 13 may be properly adjusted, after which the bolts 12 are tightened.

Referring to Figs. 1 and 6, 25 designates a member which is forwardly and rearwardly adjustable in the frame 1, to which it is adapted to be secured by a set screw 26, Fig. 6.

A roller 27 mounted on balls 28 mounted on the periphery of a sleeve 29, which is clamped between two arms 30 of the block or member 25 by a horizontal bolt 31. The roller 27 is provided with a peripheral groove of V-shape in which runs the rear edge of the saw 15.

A J-shaped member 32 has its long arm adjustably mounted in a horizontal forwardly and rearwardly extending hole in the block 25 to which it is secured by a set screw 33.

Extending transversely through the arms of the member 32 is a bolt 34 on which is rotatably mounted a roller 35, the periphery of which is, preferably, concave and adapted to engage the teeth of the saw 15 to hold the saw from moving too far forwardly, when material which is being sawed is pulled forwardly from the saw. By adjusting the member 32, the roller 35 may be adjusted with respect to the roller 27. Both rollers may be simultaneously adjusted by adjusting the block 32 on the member 25, as above described.

I do not limit my invention to the structure shown and described, as modifications within the scope of the appended claims, may be made without departing from the spirit of my invention.

What I claim is:—

1. In a band saw guide, a support, two sleeves having one set of ends bearing against said support, two plates respectively bearing against the other set of ends of said sleeves, two bolts respectively connected to said support and respectively extending through said plates and said sleeves, the sleeves being laterally adjustable on said bolts, and two rollers respectively rotatable on said sleeves and adapted to respectively bear against opposite sides of a band saw.

2. In a band saw guide, a support, two bolts carried by said support, two sleeves through which said bolts respectively extend held by said bolts against said support, the holes through the sleeves being of greater diameter than the diameter of the bolts, whereby the sleeves are capable of lateral adjustment, and two rollers respectively rotatable on said sleeves.

3. In a band saw guide, a support, two bolts carried by said support, two sleeves mounted respectively on said bolts and having holes larger than the bolts to permit of lateral adjustment of the sleeves, said sleeves bearing against said support, two plates held respectively by said bolts against the sleeves, two rollers respectively mounted on said sleeves, and balls interposed between the rollers and said sleeves.

4. In a band saw guide, a support, a horizontal bolt supported by said support, a horizontal sleeve encircling and spaced apart from said bolt to form an oil receptacle, the sleeve having in its under side a hole extending therethrough, the sleeve being adjustable radially with respect to the bolt, the adjacent end of the sleeve bearing against said support, a plate held by the bolt against the other end of the sleeve, and a roller mounted revolubly on the sleeve, substantially as set forth.

5. In a band saw guide, a support, a horizontal bolt supported thereby, a horizontal sleeve encircling and spaced apart from said bolt to form an oil receptacle and bearing at one end against said support and having in its under side a hole extending therethrough, a plate held by the bolt against the other end of said sleeve and having a hole communicating with said oil receptacle, and a roller revoluble on said sleeve, substantially as set forth.

In testimony whereof I have signed my name to this specification.

WILLIAM W. PADDOCK.